United States Patent [19]

Kazama et al.

[11] 4,227,251
[45] Oct. 7, 1980

[54] CLOCK PULSE REGENERATOR

[75] Inventors: Shigeru Kazama, Obihiro; Kouzou Kage, Tokyo, both of Japan

[73] Assignees: Nippon Telegraph and Telephone Public Corporation; Nippon Electric Co., Ltd., both of Tokyo, Japan

[21] Appl. No.: 969,120

[22] Filed: Dec. 13, 1978

[30] Foreign Application Priority Data

Dec. 20, 1977 [JP]  Japan ................................ 52-153849

[51] Int. Cl.³ ........................................... H04L 25/66
[52] U.S. Cl. .................................... 375/110; 328/164;
375/4; 375/104
[58] Field of Search ....................... 178/53, 69.1, 70 R,
178/70 T, 70 TS; 179/15 BS; 325/13; 328/72,
74, 75, 155, 164; 340/147 SY

[56]  References Cited
U.S. PATENT DOCUMENTS

| | | | |
|---|---|---|---|
| 3,781,696 | 12/1973 | Loon | 328/164 |
| 4,064,361 | 12/1977 | Kustka | 178/69.1 |
| 4,087,627 | 5/1978 | Sato et al. | 178/69.1 |
| 4,160,951 | 7/1979 | Thyselius | 328/164 |

*Primary Examiner*—Benedict V. Safourek
*Attorney, Agent, or Firm*—Sughrue, Rothwell, Mion, Zinn and Macpeak

[57] ABSTRACT

A clock pulse regenerator is constructed with digital circuits and may be built using large scale integration techniques. An oscillator produces first pulses at a repetition rate higher than that of the incoming digital data signal. A first counter counts the first pulses to produce the regenerated clock pulses. A gate pulse generator is responsive to both the incoming digital data signal and the regenerated clock pulses to generate a gate pulse having a pulse width proportional to a phase difference between the two signals. A third counter counts the number of leading and trailing edges of the incoming digital data signal. The pulse outputs of the second and third counters are supplied to a gate circuit. A fourth counter counts the pulses transmitted by the gate circuit to produce, after a predetermined count, a reset pulse for the first, second, third and fourth counters. The second, third and fourth counters therefore serve as a phase detector. The detection output resets the first counter which generates the clock pulse sequence with the received input.

9 Claims, 42 Drawing Figures

CLOCK PULSE REGENERATOR

FIELD OF THE INVENTION

This invention relates generally to a clock pulse regenerator or a timing pulse generator for use in a digital data receivers, and particularly to such a regenerator for generating, in response to an incoming digital data signal, a clock pulse sequence substantially free from phase jitter as well as phase deviation.

BACKGROUND OF THE INVENTION

Several clock pulse regenerators have been proposed which produce, in response to an incoming digital data signal a sequence of clock pulses substantially free from phase jitter. The digital data is, for example, an NRZ (nonreturn to zero) signal. One conventional clock pulse regenerator limits the regenerated clock pulses with a high Q filter to suppress phase jitter. This approach, however, encounters a problem in that the resultant clock pulses are undesirably phase-shifted so that an additional delay circuit is required for compensation for the phase shift. Additionally, inasmuch as this approach is of the analog type, it is unsuitable for large scale integration techniques. Furthermore, a considerable amount of time is required for the regenerated clock pulse to be initially synchronized with the incoming digital data, and the resultant clock pulse is liable to vary in phase with ambient temperature variation.

Another conventional clock regenerator comprises a voltage controlled oscillator for producing output pulses of a repetition period approximately equal to the clock period of a digital input signal, a phase detector for phase-detecting the input signal with reference to the output pulses to produce a detection output of a voltage dependent on the phase difference between the repetition and clock period, and a negative feedback loop for controlling the oscillator in response to the detection output. The regenerator is capable of readily phase-synchronizing the output pulses with the clock periods and of achieving a high effective Q value by adjusting the loop gain to thereby appreciably raise the stability of clock regeneration against noise, jitter and the like. The oscillator, however, follows the clock period with a considerable delay at the beginning either when the channel of the input modulated signal is switched to another channel or when the modulated signal is supplied to the receiver in bursts.

Other related prior art circuits are disclosed in, for example, U.S. Pat. Nos. 4,064,361 and 4,087,627.

SUMMARY OF THE INVENTION

It is therefore an object of the present invention to provide a clock pulse regenerator for producing a clock pulse sequence substantially free from phase jitter and/or phase deviation. According to this invention, there is provided a clock pulse generator producing a sequence of first pulses at a repetition rate considerably higher than that of an incoming digital data signal. The sequence of first pulses is applied to a first counter which counts the applied pulses to produce a sequence of regenerated clock pulses. Gate signal generating means receives the incoming digital data signal as well as the regenerated clock pulses to generate a gate pulse having a pulse width proportional to a phase difference between the two received signals. The gate pulse is applied to first gate means for selectively transmitting the first pulses therethrough. The first pulse from the first gate is applied to and counted by a second counter which produces a pulse every time the counted number reaches a preset number. A third counter receives and counts the number of leading and trailing edges of the incoming digital data signal and producing an output upon the counted number reaching a fixed number. A second gate means receives the output of the second counter and the first pulses, and selectively transmits them in accordance with the output of the third counter. The output pulses of the second gate means is applied to a fourth counter, which counts the applied pulses to produce a pulse upon counting the number of pulses corresponding to the number of the first pulses occurring during one period or integral multiples of the regenerated clock pulse. The pulse from the fourth counter serves as a reset pulse for resetting the first, second, third and fourth counters.

DESCRIPTION OF THE PREFERRED EMBODIMENT

Figure 1:
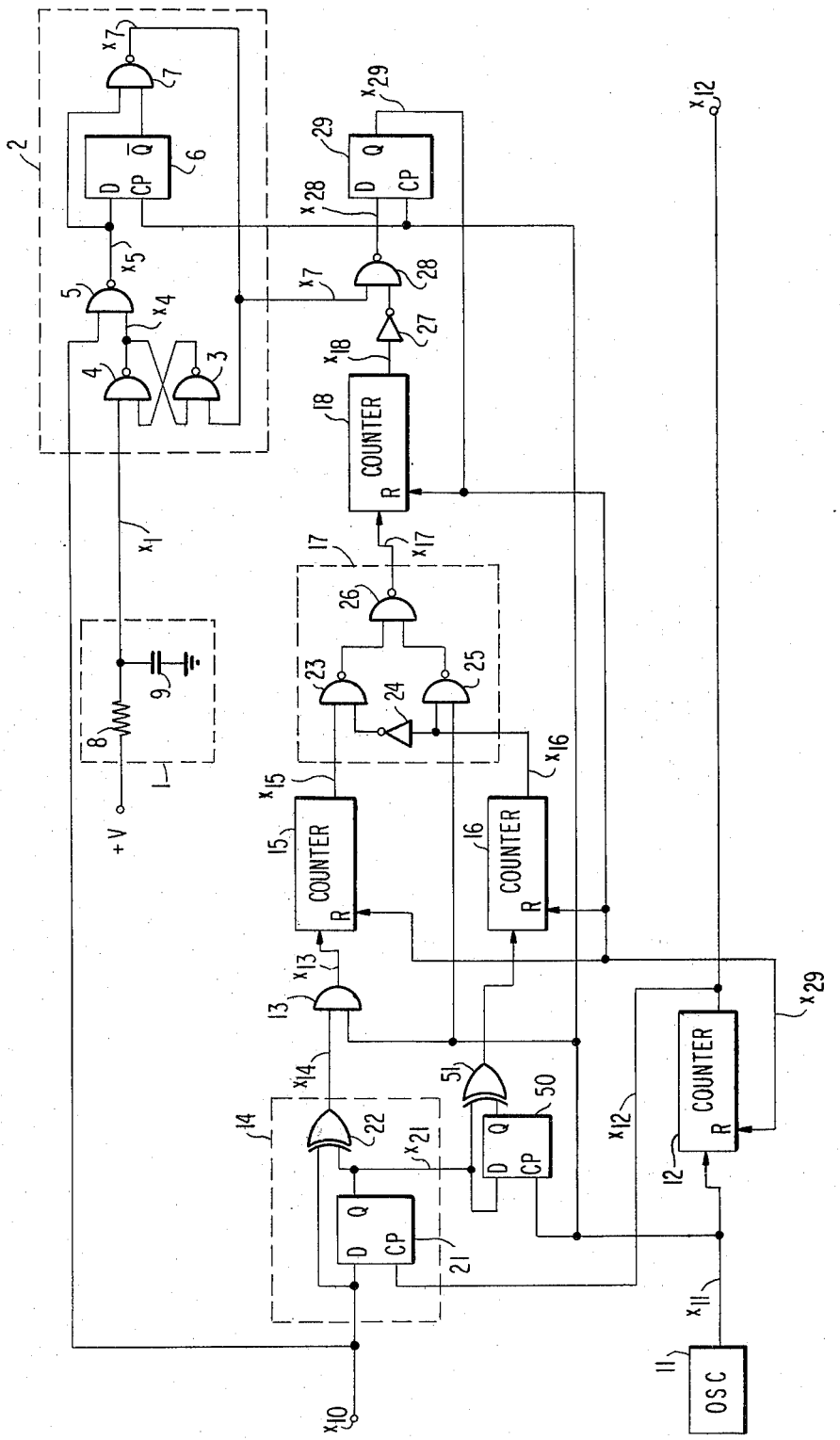
FIG. 1 is a digital circuit diagram of a clock regenerator embodying the present invention.
Figure 2:
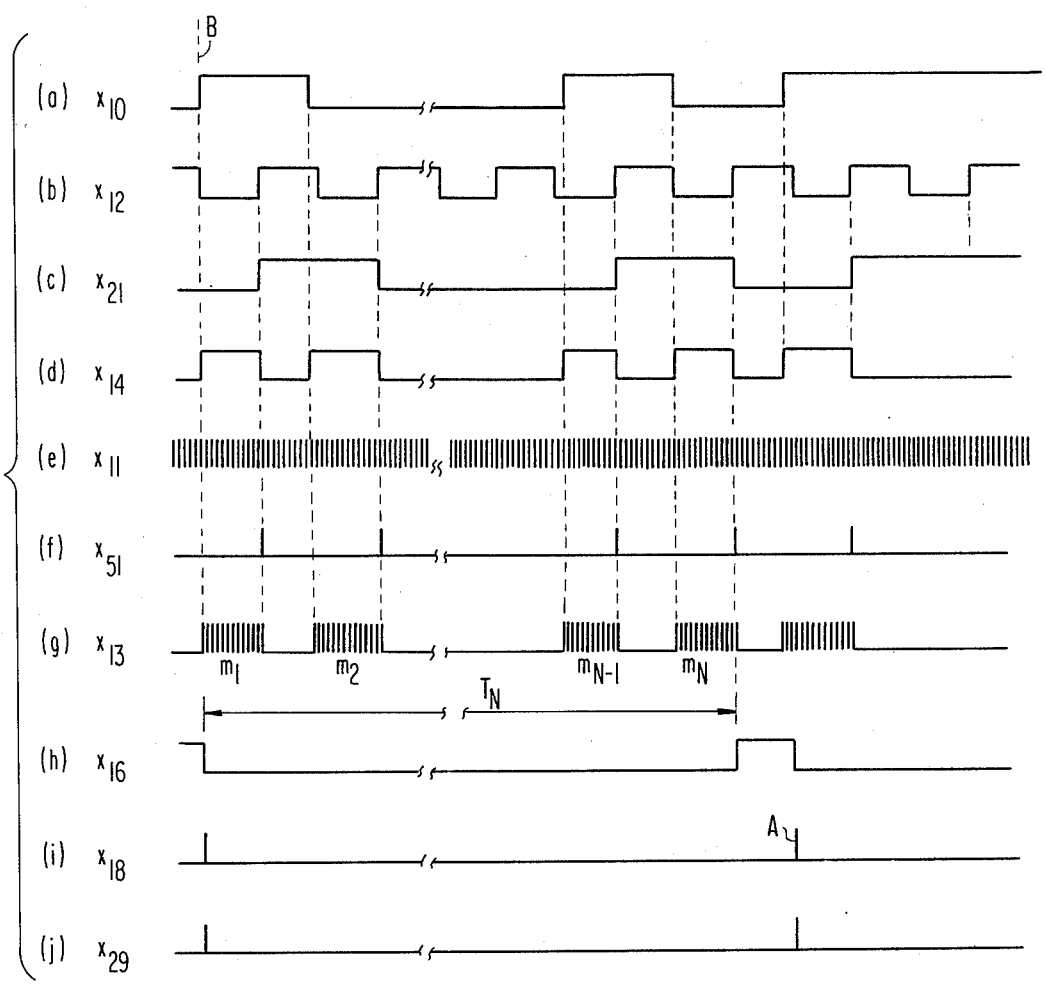
FIGS. 2(a) to 2(j) and 3(a) to 3(e) are each a waveform diagram illustrating digital signals appearing at various parts of the clock regenerator of FIG. 1.

FIG. 1 schematically illustrates a circuit diagram of a digital circuit embodying this invention, and FIGS. 2(a) to 2(j) show various waveforms appearing at various parts of the circuit of FIG. 1. The circuit of FIG. 1 will be hereinafter discussed in conjunction with FIGS. 2(a) to 2(j). An oscillator 11 generates a signal $x_{11}$ (shown in FIG. 2(e)) pulsating at a rate considerably higher than an incoming digital data signal $x_{10}$ which is applied to one input terminal D of a flip-flop (hereinafter referred to as FF) 21 of a gate pulse generator 14. The signal $x_{10}$ is, for example, an NRZ signal as shown in FIG. 2(a). The gate pulse generator 14 comprises, in addition to the FF 21, an exclusive-OR gate 22. A counter 12 supplied with the signal $x_{11}$ counts the number of the applied signals to generate a regenerated clock pulse $x_{12}$ (shown in FIG. 2(b)) which is assumed to be in synchronism with $x_{10}$. The signal $x_{12}$ is applied to the other input terminal CP of the FF 21, triggering the same at its leading edge to produce a delayed replica $x_{21}$ (shown in FIG. 2(c)) of $x_{10}$ at an output terminal of the FF 21. The Exclusive-OR gate 22 receives at one input the dealyed replica $x_{21}$, while receiving directly at the other input the signal $x_{10}$, to generate a signal $x_{14}$ as shown in FIG. 2(d). The signal $x_{14}$ has pulse widths each representing the phase difference between the signals $x_{10}$ and $x_{12}$, and is fed to an AND gate 13. The gate 13 is also supplied with the signal $x_{11}$ from the oscillator 11, and selectively permits the signal $x_{11}$ to be transmitted therethrough under the control of $x_{14}$. The gate 13 produces the signal $x_{13}$ as shown in FIG. 2(g). A counter 15 with a frequency division ratio of 1/N is connected at its input terminal to the AND gate 13. The counter 15 is supplied with the signal $x_{13}$ generating a pulse every time the applied pulses reach the number N. The output of the counter 15 is denoted by reference $x_{15}$, although its waveform is not shown in FIG. 2.

Figure 8:
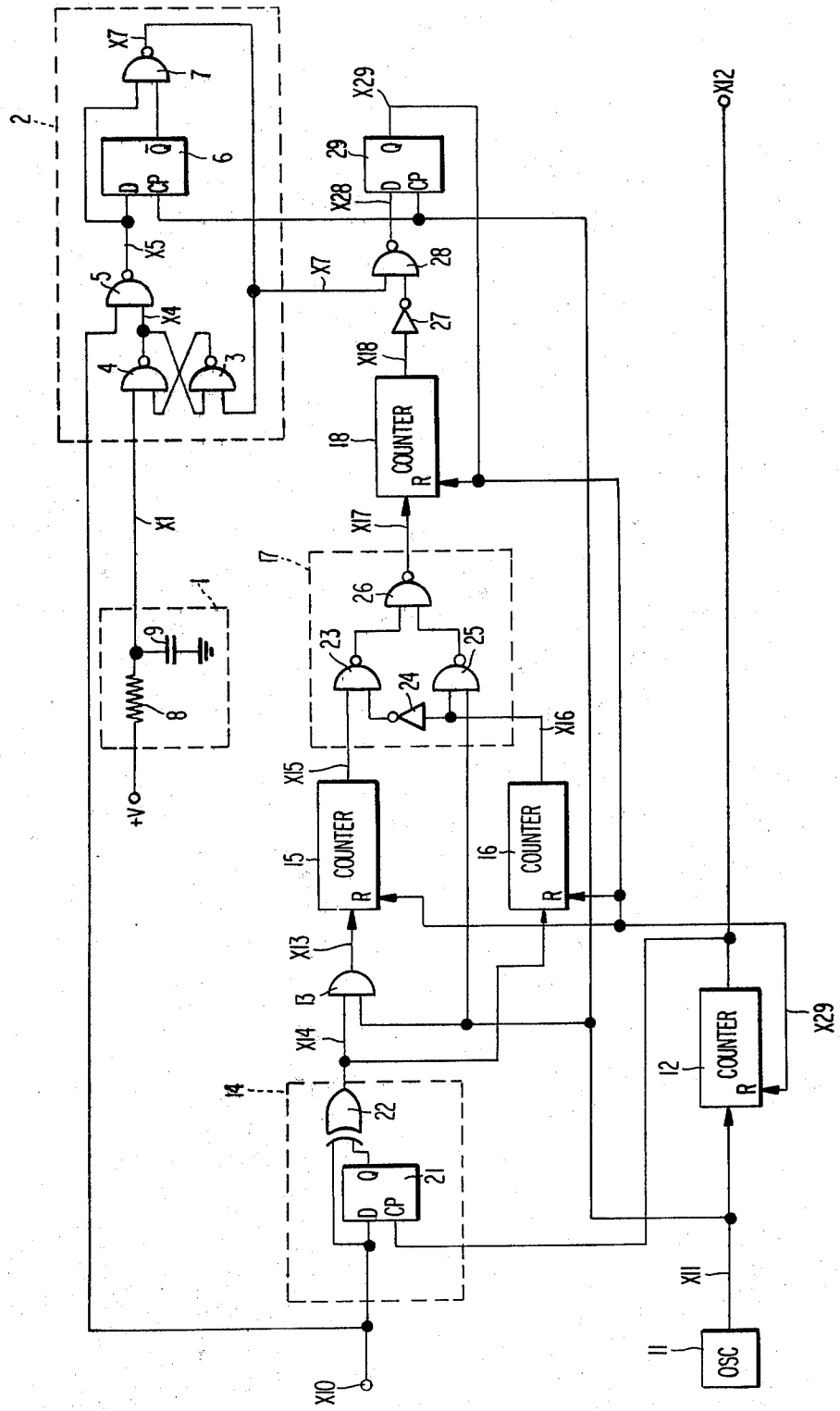
FIG. 8 is a modified circuit diagram of a clock regenerator embodying the present invention.

Another FF 50 receives, at its input terminals D and CP, the signals $x_{21}$ and $x_{11}$, respectively, to be triggered by the latter, then, generating a delayed replica of $x_{21}$. The output of the FF 50 is fed to another Exclusive-OR gate 51 to which the signal $x_{21}$ is also applied. The gate 51 acts jointly with the FF 50 to respond to leading and trailing edges of the signal $x_{21}$ (corresponding to those of the signal $x_{10}$) to generate a train of pulses $x_{51}$ as shown in FIG. 2(f). A counter 16 is connected at its input to the Exclusive-OR gate 51, to receive and count the pulses of $x_{51}$. The output $x_{16}$ of the counter 16 rises to its high level, viz, a logic "1" upon counting the received pulses up to N. The counter 16 counts the number of pulses $x_{51}$ as shown in FIG. 1, but can be alternatively modified so as to count the pulses $x_{14}$ as shown in FIG. 8. The signal $x_{16}$ shown in FIG. 2(h) is fed to a gate circuit 17 which comprises three NAND gates 23, 25 and 26, and an inverter 24. The gate circuit 17 selectively transmits therethrough the signals $x_{15}$ and $x_{11}$ depending upon the signal $x_{16}$. More specifically, the gate circuit 17 passes the signal $x_{15}$ and $x_{11}$ therethrough when the signal $x_{16}$ is at its low and high levels, respectively. A counter 18, connected to the gate circuit 17, yields an output only upon counting the fixed number of pulses which corresponds to the number of pulses of $x_{11}$ appearing during one period ($t_1$) of $x_{12}$. Since the pulses of $x_{15}$ are counted by the counter 18 as long as the signal $x_{16}$ remains at its low level ($T_N$ in FIG. 2), when the gate circuit 17 terminates the supply of the signal $x_{15}$ to the counter 18, the numerical information stored in the counter 18 indicates:

1. The number of pulses of $x_{11}$ occurring during N pulse widths of $x_{14}$ in the time interval $T_N$;
2. N x (the number of pulses of $x_{11}$ occurring during an average of pulse widths of $x_{14}$); and
3. N x (an average ($t_2$) of time intervals between the leading edges, and the leading and trailing edges of $x_{10}$).

Strictly speaking, however, the numerical information in the counter 18 slightly differs from each value of the above items 1 through 3 by a pulse width of $x_{11}$, since the signal $x_{51}$ is a replica of one pulse of $x_{11}$ delayed by its one pulse width. However, this difference in practice can be made negligible by increasing the repetition rate of $x_{11}$.

Upon the signal $x_{16}$ assuming its high level, the counter 18 starts counting the pulses of $x_{11}$ and yields a pulse A of a signal $x_{18}$ (shown in FIG. 2(i)) after counting them during a time interval of $t_1-t_2$. This is because the counter 18 has already counted the pulses of $x_{15}$ corresponding to the number of pulses of $x_{11}$ occurring during $t_2$. In other words, the pulse A occurs after a time interval corresponding to the low level interval $T_N$ plus the high level interval of $x_{16}$ relative to a time instant B. The output $x_{18}$ is fed, through an inverter 27 and a NAND gate 28, to a FF 29. The FF 29 produces a reset pulse 29 shown in FIG. 2(j), that is, a replica of $x_{18}$ delayed by a pulse width of $x_{11}$. The reset pulse $x_{29}$ is applied to the counter 12 for resetting it. As a result, the regenerated clock pulses $x_{12}$ are phase-locked against an average of jittered or fluctuated phases of the incoming digital data $x_{10}$. The reset pulse $x_{29}$ is also applied to the other counters 15, 16 and 18 for resetting them.

Although the counter 18 yields the reset pulse $x_{29}$ upon counting up to the fixed number corresponding to the number of pulses of $x_{11}$ which occurs during one period of $x_{12}$, the time interval is not necessarily limited to the one period and integral multiples of one period of $x_{12}$.

A circuit 2 acts jointly with a circuit 1 to generate a reset pulse $x_7$ in synchronism with the trailing edges of $x_{10}$ after the circuit of FIG. 1 is initially energized. The reset pulse $x_7$ causes the FF 29 to produce the reset pulse $x_{29}$ for resetting the counters 12, 15, 16 and 18 for preliminary phase-synchronizing the regenerated clock pulse $x_{12}$ with $x_{10}$.

Figure 3:
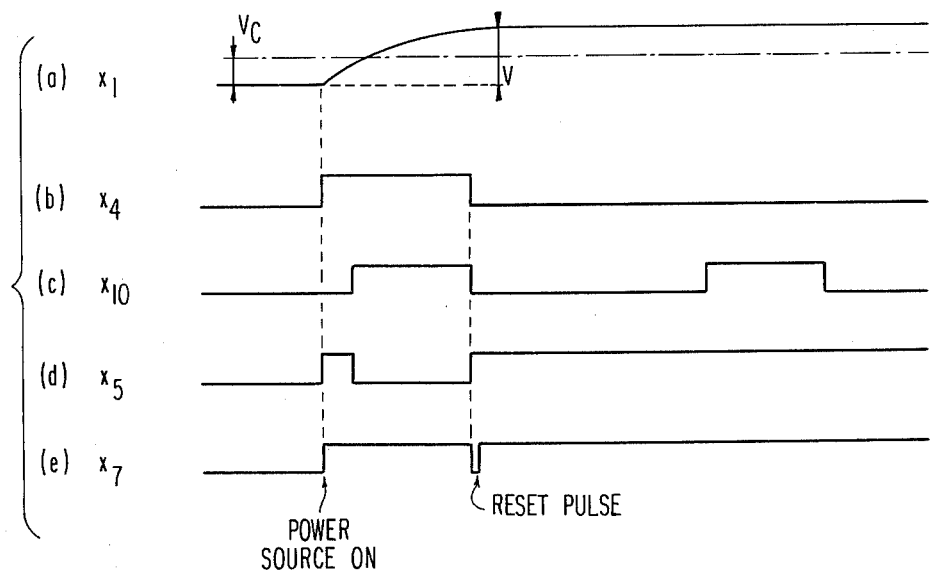

The circuits 1 and 2 of FIG. 1 will be discussed with reference to FIGS. 3(a) to 3(e) as well as FIG. 1. The circuit 1 comprises a resistor 8 (R ohm) and a condenser 9 (C farad), while the circuit 2 comprises a pair of cross-coupled NAND gates (i.e., a flip-flop) 3 and 4, NAND gates 5 and 7, and a FF 6. When a source voltage V is applied to the circuit 1, an output $x_1$ rises exponentially up to the voltage V depending upon the time constant RC as shown in FIG. 3(a). The output $x_1$ is fed to one input terminal of the NAND gate 4 whose output $x_4$ (shown in FIG. 3(b)) is at its high level (a logic "1") until the voltage V reaches a reference voltage $V_c$ (a logic "1"). The signal $x_4$, in this case, remains at its high level even after the voltage V exceeds $V_c$ since a signal $x_7$ is at its high level. The NAND gate 5 receives at its one input terminal the signal $x_{10}$ shown in FIG. 3(c), so that an output $x_5$ of the gate 5 is as shown in FIG. 3(d). The output $x_5$ is then fed to one input terminal D of the FF 6 which receives the signal $x_{11}$ at the other input terminal CP. Thus, the signal $x_5$ is delayed through the FF 6 by a pulse width of $x_{11}$, being extracted from an output terminal of the FF 6 as a delayed reverse replica. The NAND gate 7 is supplied with the signal $x_5$ as well as the output from FF 6, generating at its output terminal the waveform $x_7$ involving a reset pulse or a serration pulse as shown in FIG. 3(e). The reset pulse having the pulse width of $x_{11}$, is fed to the NAND gate 28, causing the FF 29 to produce the reset pulse $x_{29}$ for resetting the counters 12, 15, 16 and 18. As a result, the regenerated clock pulse $x_{12}$ can be preliminary synchronized with the trailing edges of the incoming digital data signal $x_{10}$.

Figure 4:
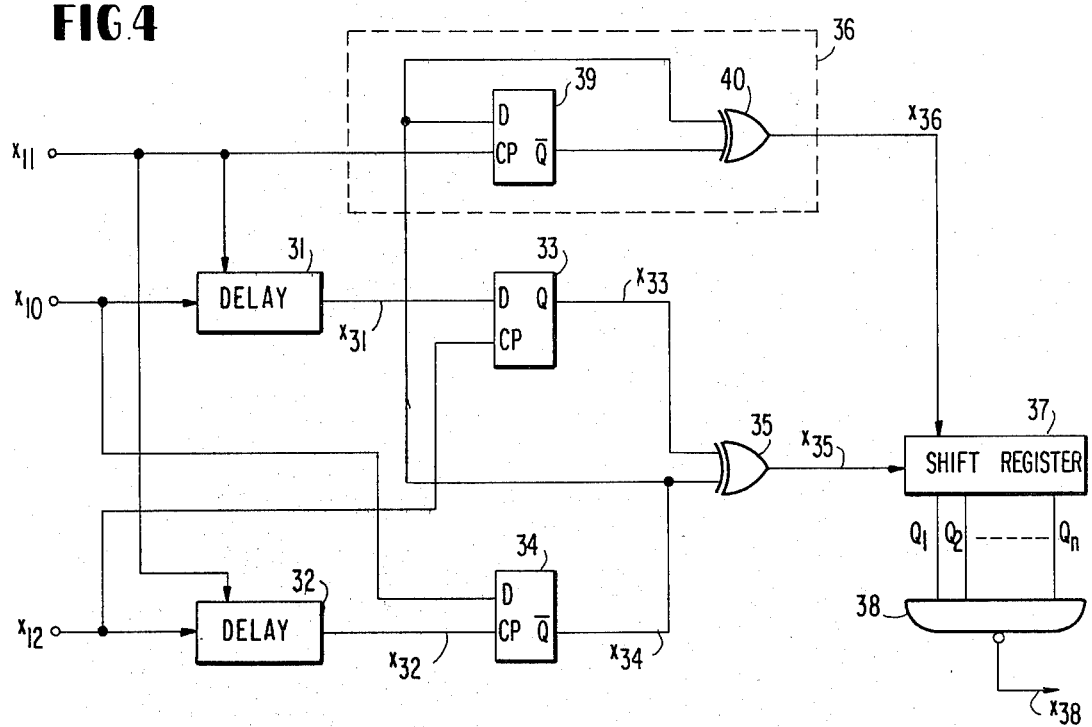
FIG. 4 is a digital circuit diagram embodying the present invention substitutable for a portion of the clock regenerator of FIG. 1.
Figure 5:
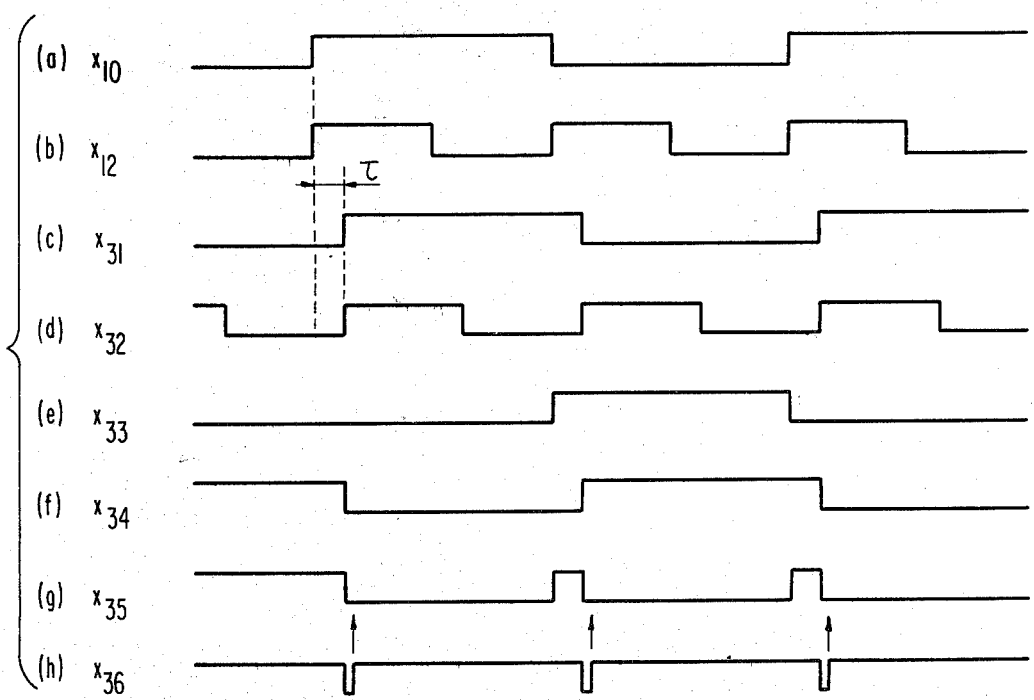
FIGS. 5(a) to 5(h) through 7(a) to 7(h) are each a waveform diagram illustrating digital signals appearing at various parts of the circuit of FIG. 4.

FIG. 4 is a circuit arrangement which may be substituted for the circuit 1 of FIG. 1. More specifically, a signal $x_{38}$ of FIG. 4 is usable instead of $x_1$ for preliminarily phase-synchronizing the clock pulse $x_{12}$ with $x_{10}$ after initial energization of the circuit of FIG. 1. The block diagram of FIG. 4 will be hereinafter discussed in conjunction with waveforms of FIGS. 5(a) to 5(h) wherein the signal $x_{10}$ is assumed to be phase-synchronized with $x_{12}$. Delay circuits 31 and 32 are supplied with the signal $x_{10}$ and $x_{12}$ shown in FIGS. 5(a) and 5(b), respectively, to provide them with a delay $\tau$ and produce delayed replicas of the inputs as shown in FIGS. 5(c) and 5(d). The delay circuits 31 and 32 are each, in this embodiment, a shift register responsive to the pulses of $x_{11}$, but not necessarily limited to a shift register. FF 34 receives, at its input terminals D and CP, the signals $x_{10}$ and $x_{32}$, respectively, yielding at its invert-output terminal Q an output $x_{34}$ (shown in FIG. 5(f)) in phase-synchronized relation with leading edges of $x_{32}$. Likewise, FF33 receives, at its input terminals D and CP, the signals $x_{31}$ and $x_{12}$, respectively, yielding at its non-inverting output terminal Q a signal $x_{33}$ in phase-synchronized relation with the leading edge of $x_{12}$. Both of the signals $x_{33}$ and $x_{34}$ are applied to an Exclusive-OR gate 35 which produces a signal $x_{35}$ (shown in FIG. 5(g)) representing whether or not the regenerated clock pulse $x_{12}$ is in synchronism with the incoming digital data signal $x_{10}$. A circuit, confined within a broken-line box 36, comprises FF 39 and an Exclusive-OR gate 40 for producing a train of clock pulses fed to a shift register 37. More specifically, the FF 39 receives the signals $x_{34}$ and $x_{11}$ at is input terminals D and CP, respectively, delaying the signal $x_{34}$ by a width of $x_{11}$ in reverse form. The output of the FF 39 is then fed to the Exclusive-OR gate 40 which also receives the signal $x_{34}$. The Exclusive-OR gate 40 yields a signal $x_{36}$ which involves serration pulses indicating the leading and trailing edge of $x_{34}$ as shown in FIG. 5(h), and which is used as clock pulses for the shift register 37 as previously stated. An instant of time immediately after the signal $x_{32}$ rises, both $x_{34}$ and $x_{33}$ are at their low level (a logic "0"), so that $x_{35}$ is at its low level as well. As a result, all outputs at output terminals Q1 through Qn of the shift register 37 are logic "0"s, so that a signal $x_{38}$ from a NAND gate 38 is a logic "1." This means that the FF 29 of FIG. 1 produces no reset pulse because the signal $x_7$ includes no serration pulse or reset pulse due to a logic "1" of $x_{38}$.

Figure 6:
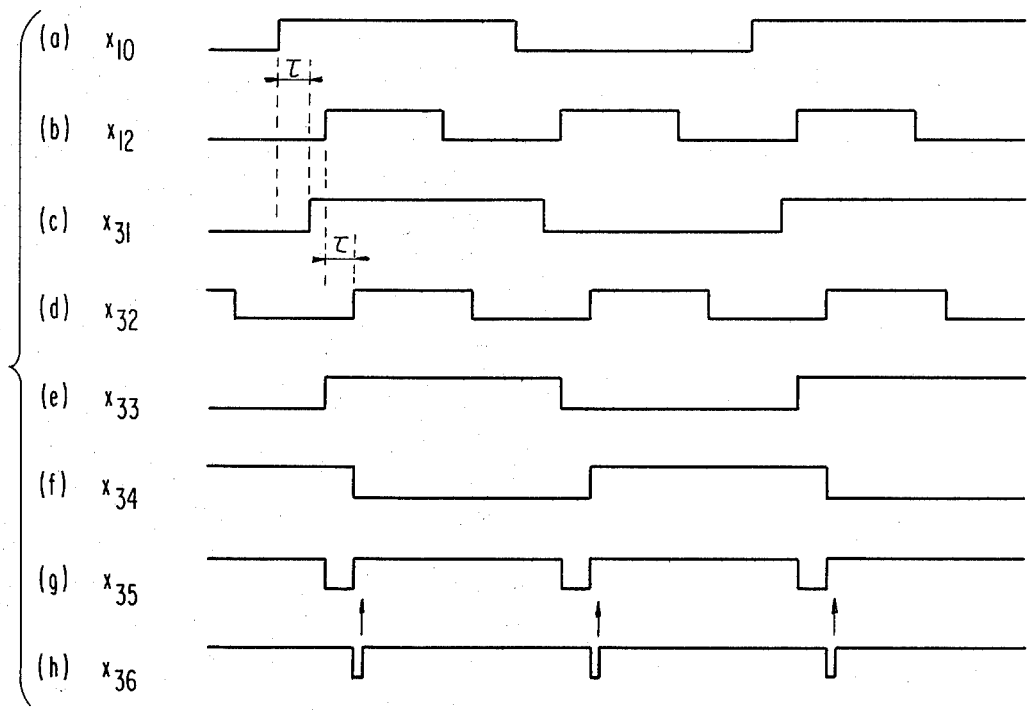
Figure 7:
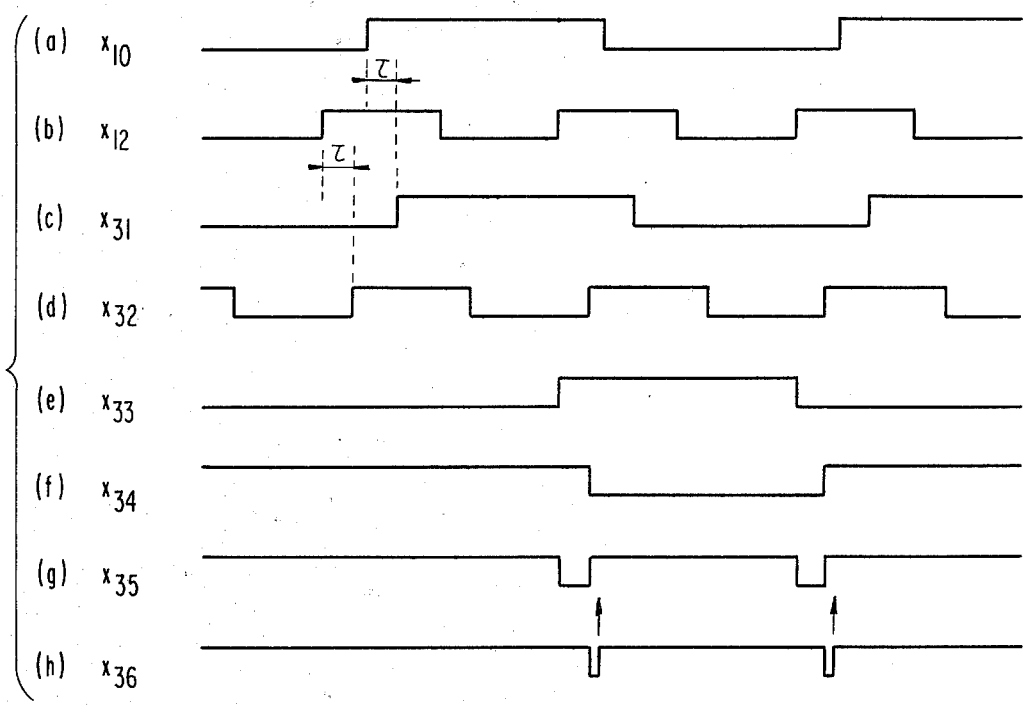

Reference is now made to FIGS. 6 and 7, wherein the waveforms of $x_{10}$ and $x_{12}$ are not synchronized. The waveform of $x_{10}$ is advanced in FIG. 6 and is retarded in FIG. 7 compared with $x_{12}$. In both cases, the signals $x_{33}$ and $x_{34}$ are not at logic "0" at the same time immediately after the signal $x_{32}$ rises, so that $x_{35}$ is at logic level "1." The states of logic "1" of $x_{35}$ are then sequentially shifted in the shift register 37 by the clock pulse $x_{36}$, resulting in the fact that the NAND gate 38 produces the signal $x_{38}$ bearing a logic "0." If this signal $x_{38}$ is applied instead of $x_1$ to the circuit 2 of FIG. 1, the signal $x_7$ makes the FF 29 produce the reset pulse $x_{29}$. Thus, all the counters 12, 15, 16 and 18 are reset, synchronizing the regenerated clock pulse $x_{12}$ with $x_{10}$. Once synchronized, it is apparent that the output of the NAND gate 38 does not assume a logic level "0."

Employing the circuit of FIG. 4 enables the clock pulse $x_{12}$ to be synchronized with $x_{10}$ soon after the supply of the source power as well as after being asynchronous due to noise disturbances, and the like. The reset pulse $x_{38}$ is produced only when all the inputs from the shift register 37 are at their high levels at the same time. This is to avoid an occasionally occurring instantaneous noise pulse from making the NAND gate 38 produce the reset pulse $x_{38}$. Should the reset pulse occur at instantaneous noises, the clock pulse $x_{12}$ is forced to be synchronized on all such occurrences with either of the leading and the trailing edges of $x_{10}$. Therefore, the phase jitter suppression is not properly implemented.

According to this invention, counters serve as a phase detector for phase-detecting a regenerated clock pulse sequence with reference to a received digital input to produce a detection output. The detection output resets another counter which generates the clock pulse sequence with the received input. Consequently, it is apparent resultant clock pulses are not subject to phase-jitter. Further, this invention is advantageously characterized by induction of the clock pulse regeneration into a state of readiness which is implemented by the circuit FIG. 4. Furthermore, the clock pulse regenerator embodying this invention can be realized by large scale integration techniques in that it is of the digital type.

While this invention has been described in terms of specific illustrative embodiments, it will be clear to those skilled in the art to which it relates that these embodiments are susceptible of a wide range of modification within the spirit and scope of the appended claims.

What is claimed is:

1. A clock pulse regenerator for producing regenerated clock pulses in response to an incoming digital data signal, comprising:
   an oscillator for producing first pulses at a repetition rate higher than that of said incoming digital data signal;
   a first counter connected to said oscillator for counting said first pulses to produce said regenerated clock pulses therefrom;
   gate signal generating means responsive to said incoming digital data signal and said regenerated clock pulses for generating a gate pulse having a pulse width proportional to a phase difference between the two received signals;
   first gate means for selectively transmitting therethrough said first pulses under the control of said gate pulse;
   a second counter for counting said first pulses from said first gate means and producing a second pulse every time the counted number reaches a fixed number;
   a third counter for counting the number of leading and trailing edges of said incoming digital data signal and producing an output upon the counted number reaching said fixed number;
   a second gate means for selecting said first and second pulses in accordance with said output of said third counter and producing a series of pulses in response to the selected first and second pulses; and
   a fourth counter for counting said series of pulses to produce a pulse upon counting a predetermined number of pulses whereby said pulse from said fourth counter resets said first, second, third and fourth counters.

2. A clock pulse regenerator as claimed in claim 1, further comprising:
   first signal generating means for producing a signal which gradually induces said clock generator into a state of readiness; and
   second signal generating means responsive to said signal from said first signal generating means and said incoming digital data signal for generating another reset pulse at either of leading and trailing edges of said incoming digital data signal to reset said first, second, third and fourth counters after initial energiziation of said clock pulse regenerator.

3. A clock pulse regenerator as claimed in claim 2, wherein said first signal generating means comprises a resistor and a capacitor, said resistor being connected between a source of power and the input of said second signal generating means and said capacitor being connected between the input of said second signal generating means and ground.

4. A clock pulse regenerator as claimed in claim 2, wherein said first signal generating means comprises:
   first delay means responsive to said incoming digital data signal to provide an onput delayed by $\tau$;
   second delay means responsive to the output of said first counter to provide an output delayed by $\tau$;
   a first flip-flop having first and second inputs connected to the output of said first delay means and the output of said first counter, respectively;

a second flop-flop having first and second inputs connected to receive said incoming digital data signal and to the output of said second delay means, respectively;

an Exclusive OR gate having its inputs connected to the noninverting output of said first flip-flop and the inverting output of said second flip-flop; and shift register means responsive to the output of said Exclusive OR gate for producing an output pulse to said second signal generating means after a predetermined number of pulses have been received from said Exclusive OR gate.

5. A clock pulse regenerator as claimed in claim 1, wherein said gate signal generating means comprises a first flip-flop having first and second inputs connected to receive said incoming digital data signal and the output of said first counter, respectively, and a first Exclusive OR gate having its inputs connected to receive said incoming digital data signal and the noninverting output of said first flip-flop.

6. A clock pulse regenerator as claimed in claim 5, wherein the output of said first Exclusive OR gate is supplied to said third counter.

7. A clock pulse regenerator as claimed in claim 5, further comprising a second flip-flop having first and second inputs connected to the noninverting output and the output of said oscillator, respectively, and a second Exclusive OR gate having its inputs connected to the noninverting outputs of said first and second flip-flops, the output of said second Exclusive OR gate being supplied to said third counter.

8. A clock pulse regenerator as claimed in claim 1, wherein said second gate means comprises first, second and third NAND gates and an inverter, each of said NAND gates having two inputs, the inputs of said first NAND gate being connected to the outputs of said second counter and said inverter, the inputs of said second NAND gate being connected to the outputs of said oscillator and said third counter, the input of said inverter being connected to the output of said oscillator, the inputs of said third NAND gate being connected to the outputs of said first and second NAND gates.

9. A clock pulse regenerator as claimed in claim 2, wherein said second signal generating means comprises a first flip-flop set by the output of said first signal generating means, a third date means controlled by said first flip-flop for transmitting therethrough said incoming digital data signal, a second flip-flop having first and second inputs connected to the outputs of said third gate means and said oscillator, respectively, and fourth gate means receiving the output of said third gate means and an output of said second flop-flop for generating said another reset pulse, said reset pulse also resetting said first flip-flop.

* * * * *

UNITED STATES PATENT AND TRADEMARK OFFICE
CERTIFICATE OF CORRECTION

PATENT NO. : 4,227,251

DATED : October 7, 1980

INVENTOR(S) : KAZAMA et al.

It is certified that error appears in the above—identified patent and that said Letters Patent is hereby corrected as shown below:

Column 1, line 6, after "use in" delete "a" .

Column 2, line 27, delete "and" .

Column 3, line 61, delete "29" and insert -- $x_{29}$ --.

Column 4, line 63, delete "Q" and insert -- $\overline{Q}$ --.

Column 6, line 63, delete "onput" and insert -- output --.

Column 8, line 19, delete "date" and insert -- gate -- ;
line 25, delete "flop-flop" and insert -- flip-flop --

Signed and Sealed this

Twenty-fourth Day of March 1981

[SEAL]

Attest:

RENE D. TEGTMEYER

Attesting Officer   Acting Commissioner of Patents and Trademarks